(12) United States Patent
Kitamura et al.

(10) Patent No.: US 6,419,796 B1
(45) Date of Patent: Jul. 16, 2002

(54) SOLVENT DISTILLATION APPARATUS

(75) Inventors: Masato Kitamura, Nagoya; Ryoji Noyori, Nisshin; Toshiaki Noda, Tajimi, all of (JP)

(73) Assignee: President of Nagoya University, Nagoya (JP)

( * ) Notice: Subject to any disclaimer, the term of this patent is extended or adjusted under 35 U.S.C. 154(b) by 0 days.

(21) Appl. No.: 09/805,037

(22) Filed: Mar. 14, 2001

(30) Foreign Application Priority Data

Oct. 26, 2000 (JP) ........................................ 2000-326876

(51) Int. Cl.[7] ............................. B01D 3/14; B01L 11/00
(52) U.S. Cl. ....................... 202/153; 202/161; 202/203; 202/267.1; 203/86; 203/DIG. 2; 422/101; 422/103
(58) Field of Search ................................ 202/161, 153, 202/170, 203, 202, 267.1, 205, 181; 203/DIG. 2, 86, 71, 91, 49, 100; 422/99–104; 261/30

(56) References Cited

U.S. PATENT DOCUMENTS

| | | | | |
|---|---|---|---|---|
| 2,476,477 A | * | 7/1949 | Berg ..................... | 203/DIG. 2 |
| 3,416,999 A | * | 12/1968 | Shephard et al. ...... | 203/DIG. 2 |
| 3,907,683 A | * | 9/1975 | Gilmont ................ | 202/177 |
| 4,238,451 A | * | 12/1980 | Ciais et al. ............ | 422/101 |
| 4,255,386 A | * | 3/1981 | Schachter et al. ...... | 422/101 |
| 5,354,428 A | * | 10/1994 | Clark et al. ............ | 202/154 |
| 5,873,980 A | * | 2/1999 | Young et al. ........... | 203/1 |

OTHER PUBLICATIONS

The Complete Laboratory Glassware Catalog 1994–95 Baxter Scientific Products, Baxter Healthcare Corporation 1994, Title page ad pp. 4,14, 407, 411, 413, 414, 430, 504, 505, 525, 528, 530, 541, 545, 560, 580, 600, 627, 667 and 756.*

* cited by examiner

*Primary Examiner*—Virginia Manoharan
(74) *Attorney, Agent, or Firm*—Oblon, Spivak, McClelland, Maier & Neustadt, P.C.

(57) ABSTRACT

The object of the invention is to provide a solvent distillation apparatus capable of preparing a highly pure anoxic, dehydrated solvent. A distilling flask is connected to a vacuum double-barrel fractionating column by a glass flange. The upper end of the fractionating column is connected to a middle portion of a reflux condenser. The upper end of the reflux condenser is provided with an outlet for a purge gas, and the lower end thereof is connected to a condensate reservoir. The base of the condensate reservoir is connected to the fractionating column near a lower end thereof via a Young cock, and also connected to a collecting flask via a Young cock and a glass flange. An immersion tube is used to blow an inactive gas into a base portion of the condensate reservoir. The fractionating column, the reflux condenser and the condensate reservoir are integrated as one body.

6 Claims, 1 Drawing Sheet

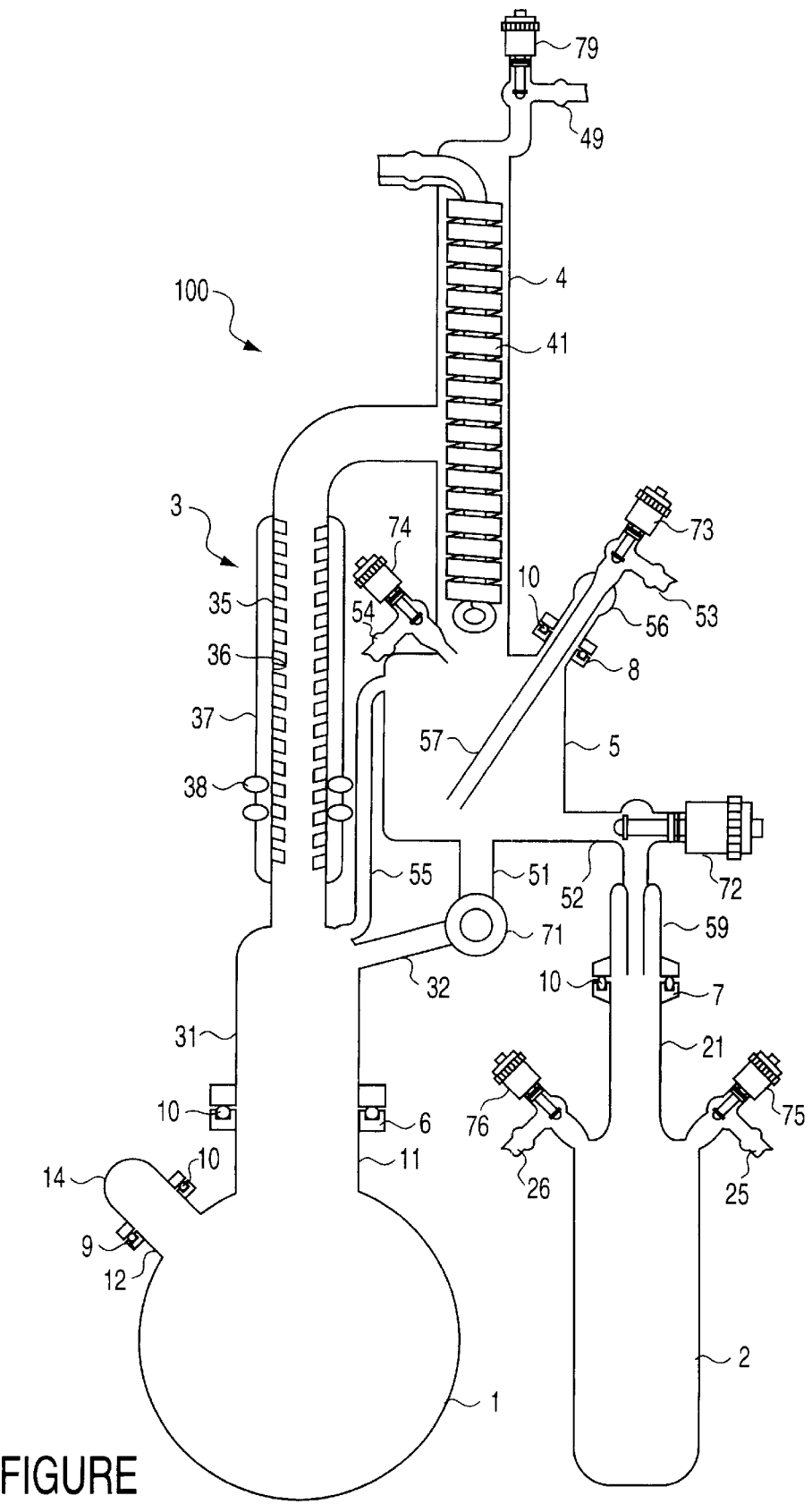
FIGURE

SOLVENT DISTILLATION APPARATUS

CROSS-REFERENCE TO RELATED APPLICATIONS

This application is based upon and claims the benefit of priority from the prior Japanese Patent Application No. 2000-326876, filed Oct. 26, 2000, the entire contents of which are incorporated herein by reference.

BACKGROUND OF THE INVENTION

This invention relates to a solvent distillation apparatus, and more particularly to the structure of a distillation apparatus for preparing an anoxic, dehydrated solvent that is used when synthesizing molecular asymmetric catalysts.

The creation of an organic substance having a new function bears an important part in maintaining and developing an advanced civilized society. Accordingly, techniques for synthesizing organic substances are becoming more and more important. In particular, the establishment of an organic synthesizing process is desired, which is of a resource/energy-saving and environmentally conscious type, and thus kinder to the world's future generations.

Throughout the world, attention is now being paid to molecular asymmetric catalysts as one of the core techniques for substance conversion, since they are highly active. Molecular asymmetric catalysts are crucial substances for the creation of functional organic substances having new qualities. In recent years, high quality molecular asymmetric catalysts are being developed one after another. Although the number of industrialized reactions using molecular asymmetric catalysts is not so large at the present stage, as compared to the number of fermentation processes using microbes and employed in the Japanese traditional industries, it is expected to increase hereafter at an accelerating speed. It is very possible that molecular asymmetric catalysts will be widely used in the material science industry, as well as in the medical/agrichemical industries.

When synthesizing a molecular asymmetric catalyst, extremely strict management of the conditions is required. To prepare a highly active molecular asymmetric catalyst, an anoxic, dehydrated solvent, for example, is indispensable. In the prior art, the following process is employed to prepare an anoxic, dehydrated solvent. A solvent as a raw material is refluxed for several hours in the atmosphere of an inactive gas in the presence of an appropriate drying agent, thereby removing the low-boiling-point component from it. After that, the thus-obtained solvent is distilled, and an anoxic, dehydrated solvent is collected as a condensate.

However, the above-described conventional refining process has these problems: (a) it is not highly productive; (b) the refining equipment requires a large installation area; (c) it has a small product yield; (d) the degree of sealing of the refining equipment is not so high, and hence the residual amounts of oxygen and water are high; (e) since a tapered joint is used at each connection of component parts of the equipment, and grease is used to seal the joint, contamination due to the grease is inevitable; and (f) it is not easy to attach each component part to the equipment or detach it therefrom.

BRIEF SUMMARY OF THE INVENTION

The present invention has been developed in light of the above-described problems in the conventional process for refining an anoxic, dehydrated solvent. It aims to provide a solvent distillation apparatus capable of preparing an anoxic, dehydrated solvent of high purity with high yield, and with high productivity.

To attain the object, there is provided a solvent distillation apparatus comprising:
a distilling flask to be supplied with a solvent before it is refined;
a collecting flask for collecting the solvent after it is refined;
a fractionating column connected to a mouth of the distilling flask;
a reflux condenser having a middle portion thereof connected to an upper end of the fractionating column, and an upper end thereof provided with an outlet for a non-condensable gas; and
a condensate reservoir connected to a lower end of the reflux condenser,
wherein:
the condensate reservoir has a base thereof connected, via a first flow adjusting valve, to a portion of the fractionating column near a lower end thereof, and also connected to the mouth of the collecting flask via a second flow adjusting valve; and
the condensate reservoir has an inlet provided near a base thereof for blowing therethrough an inactive gas.

Using the above apparatus, a solvent is refined in the following manner. First, a to-be-refined solvent is introduced into the distilling flask. Further, a drying agent is introduced into the distilling flask. After the distilling flask and the collecting flask are connected to the main body (which consists of the fractionating column, the reflux condenser and the condensate reservoir), an inactive gas is used to purge the interior of the apparatus.

After that, the distilling flask is heated while introducing cooling water into the reflux condenser, with the first and second flow adjusting valves is opened and closed, respectively. Vapor of the solvent is mainly condensed in the reflux condenser. The resultant condensate is returned from the condensate reservoir to the distilling flask through the first flow adjusting valve. At the same time, an inactive gas is blown into the condensate collected in a base portion of the condensate reservoir, thereby executing gas bubbling to purge any non-condensable gas contained in the solvent. The reflux process of the solvent eliminates any non-condensable gas therefrom. During this process, moisture contained in the solvent is also eliminated as a result of reaction between the drying agent and the solvent.

After finishing the reflux process, the first and second flow adjusting valves are closed and opened, respectively. As a result, a highly purified condensate is collected in the collecting flask.

In the solvent distillation apparatus of the invention, any non-condensable gas is purged from a condensate collected in a base portion of the condensate reservoir, by blowing an inactive gas into the condensate to bubble it while the solvent is refluxed. As a result, the purity of the condensate can be enhanced efficiently.

Preferably, the distilling flask is connected to a lower end of the fractionating column by a first glass flange with a groove for an O-ring, and the collecting flask is connected to the base of the condensate reservoir, via a second glass flange with a groove for an O-ring and the second flow adjusting valve in this order.

In the solvent distillation apparatus constructed as above, the distilling flask and the collecting flask can be easily attached to and detached from the main body. In addition, any grease for sealing connections is not required, and hence the refined product is free from contamination by-the grease.

More preferably, O-rings made of polytetrafluoroethylene are fitted in the respective grooves.

Further preferably, the fractionating column, the reflux condenser and the condensate reservoir are formed integral as one body without any couplers.

In the solvent distillation apparatus constructed as above, the gas-tightness of the apparatus is improved, and the purity of the condensate can be enhanced.

Yet preferably, the fractionating column has a double barrel structure including inner and outer tubes, an annular space defined between the inner and outer tubes being set at a vacuum pressure. The inner surfaces of the annular space are plated with silver. A number of wiggles are attached to an inner peripheral surface of the inner tube.

The fractionating column constructed as above has a high heat insulating property and hence enhances the efficiency of fraction.

In the fractionating column constructed as above, the glass bellows absorbs the difference in thermal expansion between the inner and outer tubes, thereby increasing the durability of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

The single FIGURE is a sectional view illustrating the structure of a solvent distillation apparatus according to the invention.

DETAILED DESCRIPTION OF THE INVENTION

A solvent distillation apparatus according to the invention will be described with reference to the accompanying drawing. FIGURE shows the solvent distillation apparatus of the invention. As shown, the essential part of the distillation apparatus comprises a distilling flask 1, a collecting flask 2, a fractionating column 3, a reflux condenser 4, a condensate reservoir 5, and other components. Further, reference numeral 57 denotes an immersion tube for guiding an inactive gas (an inlet of inactive gas), 51 a return tube, 52 a product tube, 71 a Young cock (a first flow adjusting valve), 72 a Young cock (a second flow adjusting valve), 6 a glass flange (a first glass flange), and 7 a glass flange (a second glass flange).

A stem 31 is connected to the end of the neck 11 of the distilling flask 1 (e.g. a 2 L-capacity flask with a rounded base) by the glass flange 6 (e.g. KN60) having a groove for an O-ring. A branch tube 12 is connected to the distilling flask 1 near the base of the neck 11. A cap 14 is attached to the branch tube 12 by a glass flange 9 (e.g. KN40) having a groove for an O-ring, thereby closing the branch tube 12. O-rings 10 made of polytetrafluoroethylene are fitted in the respective O-ring grooves of the glass flanges 6 and 9. The cap 14 connected to the branch tube 12 is detached when replenishing the flask with a solvent.

The fractionating column 3 is connected to the upper end of the stem 31, and a branch tube 32 is connected to the stem near the base of the fractionating column 3. A number of wiggles 32 are provided on the inner peripheral surface of the inner tube 35 of the fractionating column 3. An annular space is defined between the inner tube 35 and the outer tube 37 of the fractionating column 3, the pressure in which is set at a vacuum value. The inside surfaces of the annular space are plated with silver. A glass bellows 38 is inserted in the middle of the outer tube 37. The glass bellows 38 is provided for absorbing the difference in thermal expansion between the inner and outer tubes 35 and 37 of the fractionating column 3.

The upper end of the fractioning column 3 is connected to a middle portion (a vertically intermediate section) of the reflux condenser 4 (a Dimroth condenser). A coiled inner tube 41 is contained in the reflux condenser 4. Cooling water flows through the inner tube 41. A purge gas outlet 49 is connected to the upper end of the reflux condenser 4, with a Young cock 79 interposed therebetween.

The lower end of the reflux condenser 4 is connected to the ceiling of the condensate reservoir 5. The return tube 51 is connected to the base of the condensate reservoir 5. The product tube 52 is connected to a side surface of the reservoir near its base. The return tube 51 is connected to an upper portion of the stem 31 via a Young cock 71 and the branch tube 32. The product tube 52 is connected to the collecting flask 2 as described later.

A cap 56 is attached to a ceiling portion of the condensate reservoir 5 by a glass flange 8 (e.g. SKK30) having a groove for an O-ring. An O-ring 10 made of polytetrafluoroethylene is fitted in the O-ring groove of the glass flange 8, too. The immersion tube 57 is attached to the cap 56 such that it is inserted therethrough. The immersion tube 57 is inserted in a through hole formed in the glass flange 8 and extends to a position near the base of the condensate reservoir 5. The upper end of the immersion tube 57 is located outside the cap 56 and connected to a purge gas inlet 53 via a cock 73.

Further, a purge gas outlet 54 is connected to a ceiling portion of the condensate reservoir 5 via a cock 74. An interconnecting tube 55 has its upper end connected to the side wall of the condensate reservoir 5 near the ceiling thereof, and its lower end connected to an upper portion of the stem 31. In other words, a portion of the condensate reservoir 5 near its ceiling communicates with an upper portion of the stem 31 via the interconnecting tube 55.

A stem 59 is connected to the upper end of the neck 21 of the collecting flask 2 by a glass flange 7 (e.g. SKK40) having a groove for an O-ring. An O-ring 10 made of polytetrafluoroethylene is fitted in the O-ring groove of the glass flange 7, too. The product tube 52 is connected to the upper end of the stem 59, with a Young cock 72 interposed therebetween. Purge gas inlet 25 and outlet 26 are connected to respective upper portions of the collecting flask 2, with cocks 75 and 76 respectively interposed therebetween.

In the above-described solvent distillation apparatus, the stem 31, the fractionating column 3, the reflux condenser 4, the condensate reservoir 5 and the step 59 are formed integrally as one body (hereinafter referred to as a "main body (100)"). In other words, the stem 31 is directly connected to the fractionating column 3 without any coupling devices. Similarly, the fractionating column 3 is directly connected to the reflux condenser 4, the reflux condenser 4 is directly connected to the condensate reservoir 5, the condensate reservoir 5 is directly connected to the stem 31, and the stem 59 is directly connected to the inter-connecting tube 55. Further, the distilling flask 1 and the collecting flask 2 are connected to the main body 100 by the glass flanges 6 and 7, respectively, and hence can be detached therefrom. As described above, the glass flanges 7, 8 and 9 have their respective O-ring grooves, in which the respective O-rings 10 made of polytetrafluoroethylene are fitted.

A description will be given of a procedure for distilling a solvent (e.g. tetrahydrofuran) using the solvent distilling apparatus.

(a) Raw Material Charge & Purge Process

First, the distilling flask 1 (e.g. a 2 L-capacity flask with a rounded base) is charged with a solvent to be refined (e.g. 1 L of tetrahydrofuran) and a drying agent (e.g. 500 mg of sodium and 500 mg of benzophenone). The main body 100 is connected to the end of the neck 11 of the distilling flask 11 by means of the glass flange 6. Subsequently, the cap 14 is attached to the end of the branch tube 12 of the distilling flask 1, thereby closing it. Further, the main body 100 is connected to the end of the neck 21 of the collecting flask 2 by means of the glass flange 7.

After that, while keeping the Young cocks 71 and 72 open, an inactive gas (e.g. argon, of about 100–1000 mL/min.) is introduced into the condensate reservoir 5 via the cock 73, and an inactive gas (e.g. argon, of about 100–1000 mL/min.) is introduced into the collecting flask 2 through the cock 75. The thus-introduced argon gas is discharged through the cocks 74 and 76 and the Young cock 79, thereby purging the interior of the apparatus.

After purging the interior of the apparatus, the cocks 74 and 76 and the Young cock 79 are closed. Then, the Young cock 72 and the cocks 75 and 73 are closed.

(b) Reflux Process

Thereafter, while keeping the Young cock 72 closed, the opening of the Young cock 71 is adjusted, and cooling water is introduced into the coiled inner tube 41 of the reflux condenser 4. Then, the distilling flask 1 is heated, thereby starting the reflux process of the solvent therein. The Young cock 79 is kept open during the reflux process, and the outlet 49 is connected to a bubbler (not shown).

In this state, part of a solvent vapor that occurs in the distilling flask 1 is condensed in the fractionating column 3 and returned to the distilling flask 1 through the stem 31. A large amount of the solvent vapor is introduced into the reflux condenser 4 through the fractionating column 3, where it is condensed. The condensed solvent is collected in a base portion of the condensate reservoir 5. Meanwhile, the inactive gas introduced into the condenser via the cock 73 purges any non-condensable gas collected in the reflux condenser 4 to the outside of the apparatus via the Young cock 79.

The condensate thus collected in a base portion of the condensate reservoir 5 is returned into the distilling flask 1 through the return tube 51, the Young cock 71, the branch tube 32 and the stem 31. The Young cock 71 is used to adjust the flow rate of the condensate, which is to be returned to the distilling flask 1. At this time, a small amount of inactive gas (e.g. argon, of about 10 mL/min.) is blown into the condensate collected in a base portion of the condensate reservoir 5, via the cock 73 and the immersion tube 57, thereby executing gas bubbling. This process purges any non-condensable gas contained in the condensate to enhance the purity of the condensate.

The above-described reflux process is executed for several hours (e.g. three hours). As a result, the most of the non-condensable gas (typically, oxygen), contained in the solvent before the refining process, is removed. Also at this stage, water contained in the solvent is almost completely removed as a result of its reaction with the drying agent in the distilling flask 1.

(c) Distillation Process

After the reflux process is finished (in the case of distilling tetrahydrofuran, the condensate takes on a blue color), the Young cock 71 is closed. At this time, cooling water is still being supplied into the inner tube 41 of the reflux condenser 4. The Young cock 79 is kept open to continuously flow the purged gas into a bubbler through the outlet 49.

Thus, the solvent vapor from the distilling flask 1 enters the reflux condenser 4 through the fractionating column 3, condenses therein and collects in the condensate reservoir 5. The excessive amounts of the solvent return to the distilling flaks 1 through the left-hand tube (interconnecting tube 55). The condensate reservoir 5 always receives the solvent obtained immediately after distillation.

When preparing a small amount of solvent, the cock 74 is replaced with septum rubber, and a syringe is inserted through the rubber to take the solvent from the condensate reservoir 5. This operation is executed while supplying the reservoir 5 with an inactive gas (for example, at about 100 mL/min.) through the inlet/outlet port 54 to purge the outside air.

In the case that a large amount of solvent is to be prepared, at first, an inactive gas (for example, at about 100 mL/min.) is introduced from the inlet/outlet port 54 via the cock 74. Further, the cock 75 is opened, and an inactive gas is introduced into the collecting flask 2 from the inlet 25. At the same time, the cock 76 is opened, and the purge gas is supplied from the outlet 26 to a bubbler (not shown). After that, the cock 72 is opened, and the solvent is collected into the collecting flask 2 via the product tube 52, the Young cock 72, the stem 59 and the glass flange 7.

Also at this stage, the opening of the Young cock 72 is adjusted to thereby receive an amount of the condensate in the condensate reservoir 5, and a small amount of inactive gas (e.g. argon of about 10 mL/min.) is blown into it via the cock 73 and the immersion tube 57. Thus, gas bubbling is continued.

As a result, the solvent in the distilling flask 1 is distilled, and a highly-refined solvent (in this case, refined tetrahydrofuran) is collected in the collecting flask 2. At this time, any non-condensable gas (typically, oxygen) contained in the solvent before the refining process is almost completely replaced with the inactive gas. Further, water contained in the solvent is reduced to 5 ppm or less.

When detaching the collecting flask 2 from the main body 100 after the distillation process, the collecting flask 2 is sealed with a cap while blowing an inactive gas (e.g. argon) into it via the cock 75 and the inlet 25 to purge the outside air. This prevents the air from contaminating the refined solvent.

The solvent distillation apparatus shown in FIGURE can be widely used to refine, into an anoxic, dehydrated solvent, for example, an ether-based solvent such as tetrahydrofuran, ether or dioxane, etc., an armatic-series-based solvent such as benzene or toluen, etc., or a hydrocarbon-based solvent such as hexane or cyclohexane, etc. The apparatus is also applicable to refining acetonitrile, dichloromethan, chloroform, dimethyleformamide or alcohol, etc.

The solvent distillation apparatus of the invention constructed as above provides the following advantages:

(a) In the reflux and distillation processes, an inactive gas is blown into the condensate collected in a base portion of the condensate reservoir, thereby executing gas bubbling. As a result, any non-condensable gas contained in the condensate is purged, thereby efficiently increasing the purity of condensate.

(b) The main body of the apparatus, the distilling flask and the collecting flask are arranged to be connected to each other by means of glass flanges with O-ring grooves. This means that the distilling flask and the collecting flask can be easily attached to and detached from the main body. In addition, since it is not necessary to use grease to seal the connections of the tubes, contamination of the refined product caused by the grease can be avoided.

(c) Since the fractionating column, the reflux condenser and the condensate reservoir are integrated as one body, the number of coupling members, through which the outside air may enter the apparatus, is reduced. Accordingly, the gas-tightness of the apparatus is enhanced, thus raising the purity of the refined solvent.

(d) Since the fractionating column 3 composes a double-barrel vacuum fractionating column with a silver-plated inner surface, the heat insulating property of the column is enhanced and hence the efficiency of the refining process is increased.

As described above, the solvent distillation apparatus of the present invention can prepare a highly pure anoxic, dehydrated solvent with high yield, and with high productivity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solvent distillation apparatus comprising:
   a distilling flask to be supplied with a solvent before it is refined;
   a collecting flask for collecting the solvent after it is refined;
   a fractionating column connected to a mouth of the distilling flask;
   a reflux condenser having a middle portion thereof connected to an upper end of the fractionating column, and an upper end thereof provided with an outlet for a non-condensable gas;
   a condensate reservoir connected to a lower end of the reflux condenser, and having a base and an inlet provided near the base for blowing therethrough an inactive gas;
   a first flow adjusting valve connecting the base of the condensate reservoir to a lower end portion of the fractionating column; and
   a second flow adjusting valve connecting the base of the condensate reservoir to a mouth of the collecting flask.

2. The solvent distillation apparatus according to claim 1, wherein:
   the distilling flask is connected to a lower end of the fractionating column by a first glass flange with a groove for an O-ring; and
   the collecting flask is connected to the base of the condensate reservoir, via a second glass flange with a groove for an O-ring and the second flow adjusting valve in this order.

3. The solvent distillation apparatus according to claim 2, wherein O-rings made of polytetrafluoroethylene are fitted in the respective grooves.

4. The solvent distillation apparatus according to claim 2, wherein the fractionating column, the reflux condenser and the condensate reservoir are formed integral as one body without any couplers.

5. The solvent distillation apparatus according to claim 1, wherein the fractionating column has a double barrel structure including inner and outer tubes, an annular space defined between the inner and outer tubes being set at a vacuum pressure, a number of cooling fins being attached to an inner peripheral surface of the inner tube, the inner surfaces of the annular space being plated with silver.

6. The solvent distillation apparatus according to claim 5, wherein the inner and outer tubes are formed of heat-resisting glass, the outer tube being divided into upper and lower portions connected to each other by a glass bellows.

* * * * *